United States Patent
Tan et al.

(10) Patent No.: US 10,239,764 B2
(45) Date of Patent: *Mar. 26, 2019

(54) AQUEOUS COBALT CHLORIDE SOLUTION PURIFICATION METHOD

(71) Applicant: SUMITOMO METAL MINING CO., LTD., Tokyo (JP)

(72) Inventors: Toshirou Tan, Niihama (JP); Masatoshi Takano, Niihama (JP); Hideki Ohara, Niihama (JP); Satoshi Asano, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/577,507

(22) PCT Filed: May 20, 2016

(86) PCT No.: PCT/JP2016/065045
§ 371 (c)(1),
(2) Date: Nov. 28, 2017

(87) PCT Pub. No.: WO2016/194658
PCT Pub. Date: Dec. 8, 2016

(65) Prior Publication Data
US 2018/0148344 A1 May 31, 2018

(30) Foreign Application Priority Data

May 29, 2015 (JP) .................................. 2015-110666

(51) Int. Cl.
*C01G 51/00* (2006.01)
*C01G 51/08* (2006.01)
(Continued)

(52) U.S. Cl.
CPC .............. *C01G 51/085* (2013.01); *C22B 3/46* (2013.01); *C22B 23/00* (2013.01);
(Continued)

(58) Field of Classification Search
CPC ............ H01M 4/525; H01M 2004/028; C01G 51/085; C22B 15/0091; C22B 3/46
(Continued)

(56) References Cited

U.S. PATENT DOCUMENTS 805,969 A * 11/1905 Hybinette
3,902,896 A * 9/1975 Borbely .................... C22B 3/46
75/726

FOREIGN PATENT DOCUMENTS

JP 11-80986 * 3/1999
JP 2000-67862 * 3/2000
(Continued)

*Primary Examiner* — Steven J Bos
(74) *Attorney, Agent, or Firm* — Kratz, Quintos & Hanson, LLP

(57) ABSTRACT

An aqueous cobalt chloride solution purification method, in which impurities can be efficiently removed from a cobalt salt solution, includes bringing metallic nickel into contact with an aqueous solution containing cobalt chloride to remove an impurity by a substitution reaction, in which the pH of the aqueous solution containing cobalt chloride is adjusted to not less than 1.5 and not more than 2.5. Since the pH of the aqueous solution containing cobalt chloride is adjusted to not less than 1.5 and not more than 2.5, a passive film on a surface of the metallic nickel can be effectively removed, and the metallic nickel comes in contact with the aqueous solution containing cobalt chloride, so that an impurity more noble than the metallic nickel can be precipitated by the substitution reaction. The metallic nickel is (Continued)

only brought into contact with the aqueous solution containing cobalt chloride, and the impurity can be easily removed.

6 Claims, 3 Drawing Sheets

(51) Int. Cl.
*C22B 3/46* (2006.01)
*C22B 23/00* (2006.01)
*C22B 23/06* (2006.01)
*H01M 4/525* (2010.01)
*C22B 3/00* (2006.01)
*H01M 4/02* (2006.01)

(52) U.S. Cl.
CPC .......... *C22B 23/0469* (2013.01); *C22B 23/06* (2013.01); *H01M 4/525* (2013.01); *H01M 2004/028* (2013.01); *Y02P 10/234* (2015.11)

(58) Field of Classification Search
USPC ............................................ 423/493; 75/726
See application file for complete search history.

(56) References Cited

FOREIGN PATENT DOCUMENTS

| JP | 2013-194269 | * | 9/2013 |
| WO | 03-020647 | * | 3/2003 |
| WO | 2016/194659 | * | 7/2016 |

* cited by examiner

[Fig.1]
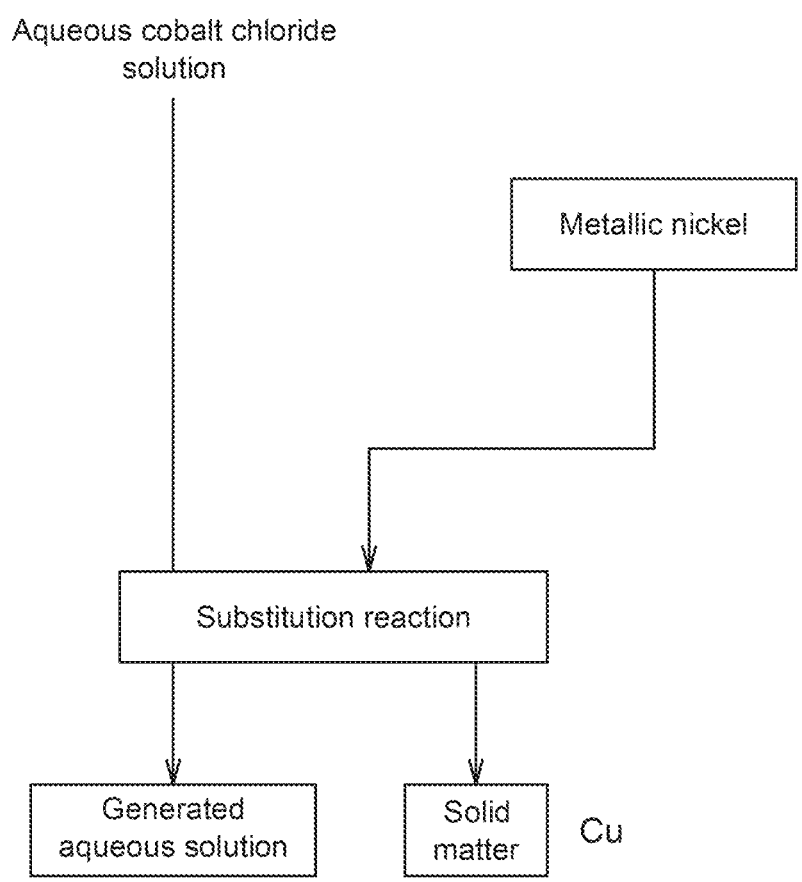

[Fig.2]
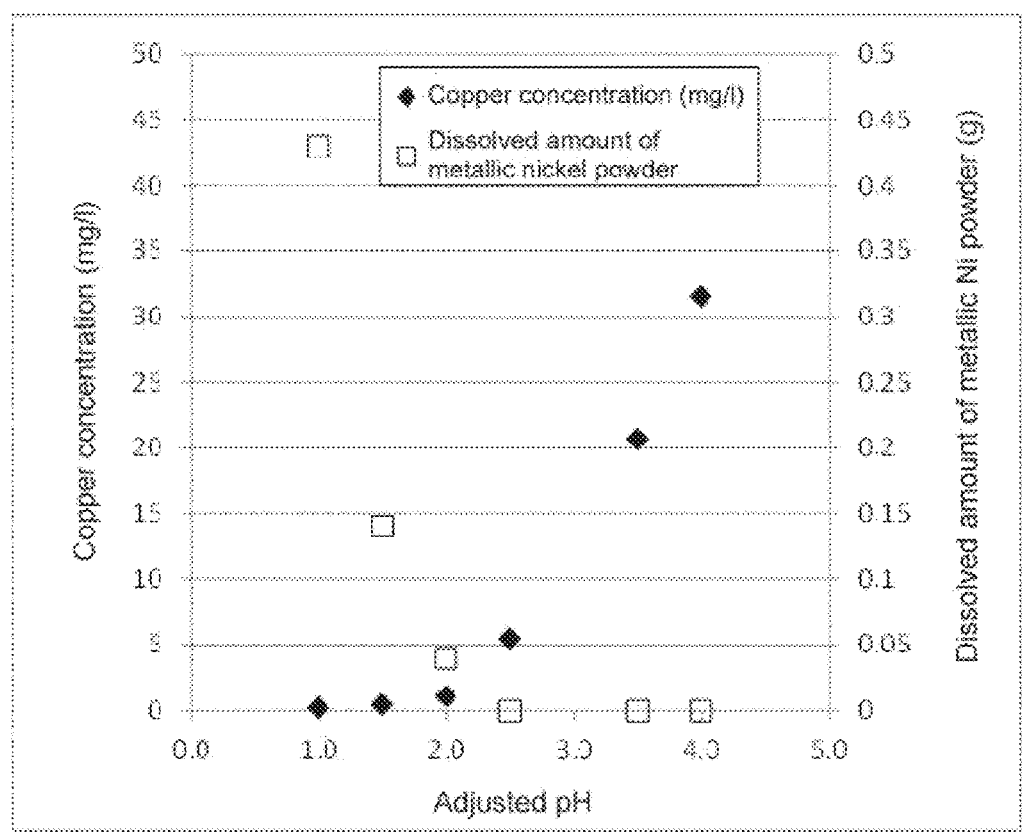

[Fig.3]
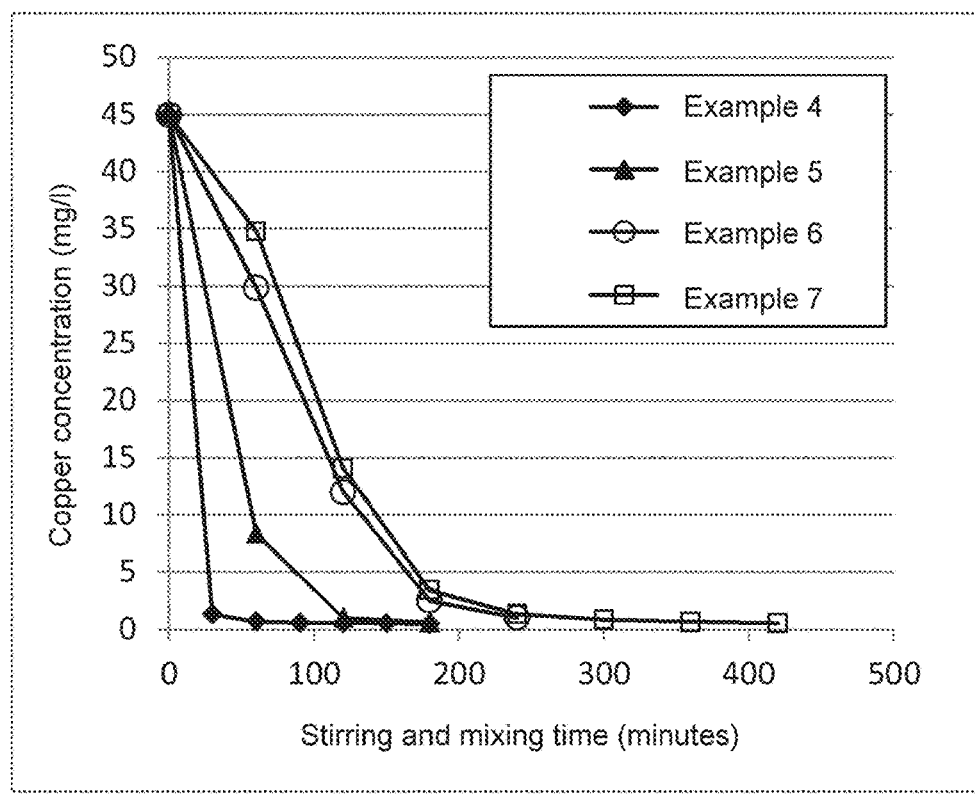

AQUEOUS COBALT CHLORIDE SOLUTION PURIFICATION METHOD

TECHNICAL FIELD

The present invention relates to an aqueous cobalt chloride solution purification method.

BACKGROUND ART

Cobalt is a rare metal and is a valuable metal used as a material of an alloy. Cobalt is also used as an electrode material for batteries other than alloys. For example, cobalt is also used for a positive electrode material of a lithium ion battery, which is a nonaqueous electrolyte secondary battery for in-vehicle use that has been developed recently.

When producing a positive electrode material of the lithium ion battery which is the nonaqueous electrolyte secondary battery, a metal hydroxide called a precursor prepared by neutralizing an aqueous solution of a metal salt mixed at a predetermined ratio is generally formed. After dehydrating this precursor, when the resulting material and a lithium compound are mixed and fired, a positive electrode material is produced. In production of a positive electrode material containing cobalt, a salt containing cobalt (for example, a cobalt salt such as cobalt sulfate or cobalt chloride) is used when the above-described aqueous solution of a metal salt is produced.

The above-described cobalt salt can be obtained as a by-product in a process of smelting nickel ore and the like. Specifically, wet processing is employed for refinement of impurities, and a cobalt salt is generated from a cobalt salt solution produced at the processing. However, in addition to nickel and cobalt, nickel ore and the like contain various kinds of impurities such as manganese, iron, copper and chromium. If the cobalt salt solution also contains impurities, the impurities may be mixed into the cobalt salt. If the cobalt salt containing impurities is used for producing the positive electrode material, impurities may be mixed into the positive electrode material.

The presence of impurities in the positive electrode material greatly affects the performance of the positive electrode material, that is, battery characteristics. In particular, since the lithium ion battery as described above has a high capacity and a high voltage, the presence of a trace amount of impurities greatly affects the battery characteristics, and therefore, specifications of impurities of raw materials such as a cobalt salt are controlled extremely strictly. In particular, since copper is an important impurity which greatly affects the performance of the battery, it is required to strictly control the amount of copper contained in raw materials such as a cobalt salt.

As a method for reducing impurities such as copper contained in the cobalt salt, methods such as a solvent extraction method and an electrolytic method have been known. In other words, when copper is removed from the cobalt salt solution by the solvent extraction method or the electrolytic method, the copper concentration in the cobalt salt solution, that is, the amount of copper contained in the cobalt salt can be reduced. However, these methods cannot significantly lower the lower limit concentration of separable copper. In addition, these methods require a large scale apparatus such as a solvent extraction apparatus such as a mixer settler, an electrolytic cell, and a power source, so that there is a problem that the cost of equipment investment increases and the processing cost increases.

As a simpler method than the solvent extraction method and the electrolytic method, there is a precipitation method. In the precipitation method, a neutralizing agent, a sulfurizing agent and the like are added to generate a precipitate and to separate impurities, and this method has been widely used for wastewater treatment for heavy metals such as copper and the like.

In a sulfurization method of precipitating and removing copper as a sulfide using a sulfurizing agent, the solubility of copper sulfide is very small (water solubility: 18° C., $3.4 \times 10^{-4}$ g/L), and there is an advantage that the concentration of copper in a solution can be greatly reduced. However, since a harmful hydrogen sulfide gas is used as a sulfurizing agent, securement of the safety of workers and environmental measures are required. Although various efforts have been made to control hydrogen sulfide (for example, Patent Document 1), the device configuration is complicated, so that there is a problem that the cost for an incidental facilities increases.

It is also conceivable to employ a neutralization precipitation method in which an alkali such as sodium hydroxide is added to form hydroxide precipitates of heavy metals and remove them. In the case of removing copper by the neutralization precipitation method, the pH of a solution is usually adjusted within the range of pH 8 to 12 from the viewpoint of solubility (for example, Non-Patent Document 1). However, since cobalt also precipitates in the same pH range, cobalt precipitates together with copper when the neutralization precipitation method is used for a cobalt salt solution, and cobalt is lost. In order to reduce the loss of cobalt, it is conceivable to remove copper in a pH range lower than the above range. Although it is possible to precipitate copper hydroxide at a pH less than pH 8, the solubility of copper hydroxide increases at the pH less than pH 8. Thus, the concentration of copper in the cobalt salt solution cannot be significantly reduced. Specifically, in order to prevent the loss of cobalt, it is necessary to set the solubility of cobalt to not less than 100 g-Co/L, and since the solubility product of cobalt is $2.2 \times 10^{-16}$, the pH must be pH 6 or less. On the other hand, the solubility product of copper is $2.2 \times 10^{-20}$, and since the solubility of copper is 14 mg-Cu/L at pH 6, the separation property of copper is deteriorated.

In addition, it is conceivable to remove copper by a cementation method (substitution method). In the cementation method, metal ions to be removed are reduced by an electrically base metal and removed. Accordingly, copper can be removed from a solution by using a metal less noble than copper. For example, cobalt is a metal less noble than copper, so that when cobalt metal is used, copper in a cobalt chloride solution can be precipitated and removed.

In the cementation method, since the base metal used is ionized and dissolved in the solution, it is necessary to use a metal which does not cause problems even when dissolved. However, since the above-described cobalt metal is a material of a positive electrode material, even if the cobalt metal remains in a cobalt salt solution, it does not affect electrode performance.

PRIOR ART DOCUMENTS

Patent Documents

Patent Document 1: WO 2003/20647
Non-Patent Document 1: "Lectures on Water Treatment Technology" written by Fumitaka Yoshimura, published by Gijutsu-Hyohron Co., Ltd., issued in 2011

SUMMARY OF THE INVENTION

Problems to be Solved by the Invention

However, cobalt metal is usually distributed as a cobalt plate, and it is difficult to obtain cobalt metal in a highly reactive powder or briquette shape. In other words, in the case of separating copper from a cobalt salt solution by cementation with use of cobalt metal, copper can only be separated by using a low reactive cobalt plate. Therefore, there is a problem that the efficiency of removing copper is deteriorated, and a method for efficiently removing copper from the cobalt salt solution has been required.

In view of the above circumstances, it is an object of the present invention to provide an aqueous cobalt chloride solution purification method that can remove impurities efficiently from a cobalt salt solution.

Means for Solving the Problems

According to a first aspect, an aqueous cobalt chloride solution purification method is a method for bringing metallic nickel into contact with an aqueous solution containing cobalt chloride to remove an impurity by a substitution reaction, in which a pH of the aqueous solution containing cobalt chloride is adjusted to not less than 1.5 and not more than 2.5.

According to a second aspect, in the aqueous cobalt chloride solution purification method of the first aspect, a temperature of the aqueous solution containing cobalt chloride is maintained at higher than 50° C. and not higher than 80° C.

According to a third aspect, in the aqueous cobalt chloride solution purification method of the first or second aspect, the impurity is copper.

According to a fourth aspect, in the aqueous cobalt chloride solution purification method of any one of the first to third aspects, the aqueous solution containing cobalt chloride from which the impurity has been removed is a solution used as a raw material of a positive electrode material containing in the composition of the positive electrode material nickel and cobalt in a nonaqueous electrolyte secondary battery.

According to a fifth aspect, in the aqueous cobalt chloride solution purification method of the fourth aspect, the aqueous solution containing cobalt chloride is a process liquid in a nickel smelting process.

According to a sixth aspect, in the aqueous cobalt chloride solution purification method of the second, third, fourth, or fifth aspect, and a temperature of the aqueous solution containing cobalt chloride is maintained at not lower than 60° C. and not higher than 80° C.

Effect of the Invention

According to the first aspect, since the pH of the aqueous solution containing cobalt chloride is adjusted to not less than 1.5 and not more than 2.5, a passive film on a surface of the metallic nickel can be effectively removed. When the passive film is removed, the metallic nickel comes in contact with the aqueous solution containing cobalt chloride, so that an impurity more noble than the metallic nickel can be precipitated by the substitution reaction. In addition, since the metallic nickel is only brought into contact with the aqueous solution containing cobalt chloride, the impurity can be easily removed from the aqueous solution containing cobalt chloride.

According to the second aspect, since a rate of removing the passive film is increased, the substitution reaction can be started promptly. Accordingly, it is possible to effectively remove the impurity.

According to the third aspect, since copper is removed to have a low concentration, the concentration of copper contained in a cobalt salt produced from the aqueous cobalt chloride solution can be lowered. Accordingly, the refined aqueous cobalt chloride solution can be used for producing a cobalt salt suitable for a raw material for producing a material adversely affected by the presence of copper, like a material of a nonaqueous electrolyte secondary battery.

According to the fourth aspect, the concentration of the impurity in the aqueous cobalt chloride solution can be drastically lowered while the aqueous cobalt chloride solution contains nickel. Accordingly, the refined aqueous cobalt chloride solution can be used as a raw material of a positive electrode material containing in the composition of the positive electrode material nickel and cobalt in a nonaqueous electrolyte secondary battery.

According to the fifth aspect, when the impurity such as copper is treated, the refined aqueous cobalt chloride solution can be used as it is as a raw material for producing a positive electrode material of a nonaqueous electrolyte secondary battery containing in the composition of the positive electrode material nickel and cobalt. Accordingly, it is not necessary to produce a cobalt salt from the process liquid of the nickel smelting process, so that the production of the positive electrode material of the nonaqueous electrolyte secondary battery can be efficiently made.

According to the sixth aspect, since the rate of removing the passive film is increased, the substitution reaction can be started promptly. Accordingly, it is possible to effectively remove the impurity.

BRIEF DESCRIPTION OF THE DRAWINGS

FIG. 1 is a schematic flow diagram of an aqueous cobalt chloride solution purification method according to the present invention.
FIG. 2 is a graph showing experimental results.
FIG. 3 is a graph showing experimental results.

MODE FOR CARRYING OUT THE INVENTION

An aqueous cobalt chloride solution purification method according to the present invention is a method for removing an impurity contained in an aqueous solution containing cobalt chloride and is characterized by being capable of efficiently and stably reducing the impurity concentration.

An aqueous solution (target aqueous solution) from which an impurity is removed by the aqueous cobalt chloride solution purification method according to the present invention may be an aqueous solution containing cobalt chloride (hereinafter simply referred to as an aqueous cobalt chloride solution). For example, it is possible to use as the target aqueous solution an aqueous solution (intermediate process liquid in nickel smelting) generated when impurities are refined by wet processing in a process of smelting nickel ore and the like or an aqueous solution generated when wet processing is performed to recover cobalt from secondary raw materials such as used batteries, sludge generated from wastewater treatment in the nickel smelting process, and the like.

The use of an aqueous solution (generated aqueous solution) generated by the aqueous cobalt chloride solution purification method according to the present invention is not also particularly limited. For example, the generated aqueous solution can be used as a raw material for producing electrolytic cobalt or cobalt salt. Further, the generated aqueous solution can also be used as a raw material of a positive electrode material containing in the composition thereof cobalt in a nonaqueous electrolyte secondary battery. As will be described later, since the generated aqueous solution is an aqueous solution containing nickel, the generated aqueous solution can be used as a raw material of a positive electrode material containing in the composition thereof nickel and cobalt in a nonaqueous electrolyte secondary battery. For example, the generated aqueous solution can be used as a raw material of a positive electrode material of a ternary (NCM) or nickel-based (NCA) lithium ion battery.

In particular, when an intermediate process liquid in nickel smelting is employed as a target aqueous solution, and the generated aqueous solution is used as a raw material of a positive electrode material containing in the composition thereof cobalt (or nickel and cobalt) in a nonaqueous electrolyte secondary battery, it is possible to obtain an advantage that production of the positive electrode material of the nonaqueous electrolyte secondary battery can be efficiently made.

That is, the positive electrode material of the nonaqueous electrolyte secondary battery is produced by firing a precursor of a metal hydroxide called a precursor prepared by neutralizing an aqueous solution of a metal salt mixed at a predetermined ratio. In this case, the aqueous solution of the metal salt is prepared by dissolving a solid matter (such as nickel salt or cobalt salt). On the other hand, the solid matter is produced from an intermediate process liquid in nickel smelting, which contains nickel salt, cobalt salt, or the like. Thus, nickel salt, cobalt salt, or the like which is in an aqueous solution state is temporarily solidified and then dissolved again to prepare an aqueous solution (raw material aqueous solution) of nickel salt or cobalt salt. Although it is considered that impurities in the raw material aqueous solution are reduced relative to the intermediate process liquid in nickel smelting, it can be considered that this takes extra labor and cost to form and dissolve the solid matter.

However, when the intermediate process liquid in nickel smelting is used as a target aqueous solution and an aqueous solution from which impurities have been removed by the aqueous cobalt chloride solution purification method according to the present invention is formed, the generated aqueous solution can be used as it is as a raw material of a positive electrode material. Thus, the process of forming and dissolving the solid matter can be omitted, so that the production of the positive electrode material of the nonaqueous electrolyte secondary battery can be efficiently made.

In the aqueous cobalt chloride solution purification method according to the present invention, metals more noble than nickel and cobalt can be removed as impurities. For example, copper, silver or the like can be removed as an impurity from an aqueous solution. In particular, when the aqueous cobalt chloride solution purification method according to the present invention is employed in order to remove copper from the aqueous cobalt chloride solution, copper can be removed to have a low concentration (for example, approximately 0.5 to 1.0 mg/L). Thus, since the copper concentration of a cobalt salt produced from the aqueous cobalt chloride solution can be reduced, it is possible to produce a cobalt salt suitable for a raw material for producing a material adversely affected by the presence of copper, like the material of the nonaqueous electrolyte secondary battery. In addition, as described above, when the generated aqueous solution is used as it is as the raw material of the positive electrode material, copper as an important impurity that greatly affects the performance of the battery can be removed to have a low concentration, so that the quality of the positive electrode material to be produced is improved.

Hereinafter, a case where copper is removed as an impurity from an aqueous cobalt chloride solution will be described as a representative example. Naturally, other impurities can be removed in the same way.

(Aqueous Cobalt Chloride Solution Purification Method According to the Present Invention)

The aqueous cobalt chloride solution purification method according to the present invention is a method for removing an impurity contained in an aqueous solution containing cobalt chloride (aqueous cobalt chloride solution) by a substitution reaction.

FIG. 1 shows a schematic flow diagram of the aqueous cobalt chloride solution purification method according to the present invention. As shown in FIG. 1, in the aqueous cobalt chloride solution purification method according to the present invention, metallic nickel is brought into contact with an aqueous cobalt chloride solution containing copper, which is a target aqueous solution, to remove copper by the substitution reaction. The chemical formula of this substitution reaction is shown in Formula 1. As can be seen from Formula 1, the metallic nickel is dissolved by the substitution reaction to become nickel ions, and copper ions are precipitated as metallic copper.

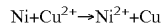

$$Ni+Cu^{2+} \rightarrow Ni^{2+}+Cu \qquad \text{(Formula 1)}$$

On the other hand, the metallic nickel usually has on its surface a passive film as an oxide, and the presence of this passive film inhibits dissolution of the metallic nickel. Thus, in the aqueous cobalt chloride solution purification method according to the present invention, the pH of the aqueous cobalt chloride solution is adjusted to a value that can effectively remove the passive film. Specifically, the pH of the aqueous cobalt chloride solution is adjusted to not less than 1.5 and not more than 2.5. When the pH of the aqueous cobalt chloride solution is adjusted to the above-described pH range, the passive film on the surface of the metallic nickel is removed by the reaction shown in Formula 2, and nickel atoms are exposed on the surface of the metallic nickel.

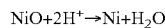

$$NiO+2H^+ \rightarrow Ni+H_2O \qquad \text{(Formula 2)}$$

As described above, when the passive film is removed and the nickel atoms are exposed, the aqueous cobalt chloride solution comes in contact with the metallic nickel, so that the substitution reaction described above is caused. In other words, since copper can be precipitated instead of dissolving nickel in the aqueous cobalt chloride solution, the copper concentration (copper ion concentration) in the aqueous cobalt chloride solution can be reduced.

(pH of Aqueous Cobalt Chloride Solution)

The pH of the aqueous cobalt chloride solution is adjusted such that when the aqueous cobalt chloride solution and the metallic nickel come in contact with each other, removal of the passive film and the substitution reaction are caused. That is, as described above, the pH of the aqueous cobalt chloride solution is adjusted to not less than 1.5 and not more than 2.5. If the pH is more than 2.5, the effect of removing the passive film is not sufficient, and the concentration of copper cannot be sufficiently reduced. On the other hand, if the pH is less than 1.5, the metallic nickel is dissolved irrespective of the substitution reaction, so that efficiency of precipitating copper is deteriorated. In addition, since the amount of hydrogen generated per unit time increases, a safety device is additionally required, and the facility cost increases. Accordingly, the pH of the aqueous cobalt chloride solution is preferably not less than 1.5 and not more than 2.5, more preferably not less than 1.7 and not more than 2.3.

The method for adjusting the pH of the aqueous cobalt chloride solution is not particularly limited. For example, in the case of an intermediate process liquid in nickel smelting, the pH thereof is less than 1.5, so that the pH can be increased by adding sodium hydroxide or the like. In the case of an aqueous solution generated when wet processing is performed in order to recover cobalt from secondary raw materials such as used batteries, sludge generated from wastewater treatment in a nickel smelting process, and the like, the pH may be more than 2.5. In this case, the pH can be adjusted within the above range by adding hydrochloric acid.

(Regarding Temperature of Aqueous Cobalt Chloride Solution)

In the aqueous cobalt chloride solution purification method according to the present invention, it is desirable to raise the liquid temperature of the aqueous cobalt chloride solution. When the liquid temperature of the aqueous cobalt chloride solution is raised, the rate of removing the passive film is increased, and the rate of the substitution reaction is increased, so that the impurity can be effectively removed.

It is desirable to maintain the liquid temperature of the aqueous cobalt chloride solution at higher than 50° C. If the liquid temperature is not higher than 50° C., the removal of the passive film is delayed, and it takes time to remove copper by the substitution reaction. In addition, even if the liquid temperature of the aqueous cobalt chloride solution is excessively increased, the copper removing effect is not enhanced relative to an increase in heating cost. If the liquid temperature of the aqueous cobalt chloride solution increases, corrosion resistance of reaction equipment is further required, leading to an increase in facility cost. Accordingly, it is desirable to maintain the liquid temperature of the aqueous cobalt chloride solution at higher than 50° C., and it is preferably higher than 50° C. and not higher than 80° C. in order to obtain the copper removing effect while preventing the increase in facility cost. In order to further enhance the copper removing effect, the liquid temperature is preferably not lower than 55° C. and not higher than 80° C., more preferably not lower than 60° C. and not higher than 80° C.

The method of heating the aqueous cobalt chloride solution is not particularly limited, and any known method and equipment can be employed. For example, steam heating, electric heating, or the like can be employed.

(Regarding Metallic Nickel)

The metallic nickel to be brought into contact with the aqueous cobalt chloride solution may have any shape. For example, metallic nickel in the form of a plate, powder, crushed briquettes, or the like can be used. Particularly, in order to increase the efficiency of the substitution reaction, powders having a large specific surface area or crushed briquettes are preferable.

(Regarding Contact of Aqueous Cobalt Chloride Solution and Metallic Nickel)

The method for bringing the aqueous cobalt chloride solution and the metallic nickel into contact with each other is not particularly limited, and it may be sufficient that they come in contact with each other such that removal of a nonconductor film and the substitution reaction are caused simultaneously at the interface where they are in contact with each other. That is, it may be sufficient that contact time between the aqueous cobalt chloride solution and the metallic nickel can be secured to some extent. For example, the metallic nickel may be immersed in the aqueous cobalt chloride solution, or the aqueous cobalt chloride solution may pass through the metallic nickel (when the metallic nickel is in the form of a powder or crushed briquettes). Further, the aqueous cobalt chloride solution may be flown along a surface of the metallic nickel (when the metallic nickel is in the form of a plate). In order to efficiently cause the substitution reaction, it is desirable to immerse the metallic nickel in the aqueous cobalt chloride solution.

EXAMPLES

The effect of removing an impurity by the aqueous cobalt chloride solution refinement method according to the present invention was confirmed.

In the experiments, it was confirmed how the copper concentration in an aqueous cobalt chloride solution changes by immersing metallic nickel in the aqueous cobalt chloride solution.

(Influence of pH of Aqueous Cobalt Chloride Solution)

The influence of the pH of the aqueous cobalt chloride solution on the copper removing effect was confirmed.

Example 1

A pH was adjusted to 1.5 by adding an aqueous sodium hydroxide solution having a concentration of 2 mol/L to 200 mL of an aqueous cobalt chloride solution having a pH of 0.3, a copper concentration of 45 mg/L, and a cobalt concentration of 67 g/L. One gram of a metallic nickel powder was added to the aqueous cobalt chloride solution to be stirred and mixed for 90 minutes while maintaining the liquid temperature at 80° C.

Thereafter, the mixture was subjected to solid-liquid separation, and the copper concentration in the filtrate was analyzed using ICP emission spectrometry.

On the other hand, the nickel powder was recovered, dried, and then weighed to confirm the dissolved amount.

Example 2

The same operation as in Example 1 was carried out except that sodium hydroxide having a concentration of 2 mol/L was added to adjust the pH to 2.0.

Example 3

The same operation as in Example 1 was carried out except that sodium hydroxide having a concentration of 2 mol/L was added to adjust the pH to 2.5.

Comparative Example 1

The same operation as in Example 1 was carried out except that sodium hydroxide having a concentration of 2 mol/L was added to adjust the pH to 1.0.

Comparative Example 2

The same operation as in Example 1 was carried out except that sodium hydroxide having a concentration of 2 mol/L was added to adjust the pH to 3.0.

Comparative Example 3

The same operation as in Example 5 was carried out except that sodium hydroxide having a concentration of 2 mol/L was added to adjust the pH to 3.5.

The results are shown in Table 5 and FIG. 2.

In Table 1 and FIG. 2, the copper concentration and the dissolved amount of a metallic nickel powder are shown.

TABLE 1

| | Adjusted pH | Copper concentration (mg/L) | Dissolved amount of metallic nickel powder (g) |
|---|---|---|---|
| Example 1 | 1.5 | 0.5 | 0.14 |
| Example 2 | 2.0 | 1.1 | 0.04 |
| Example 3 | 2.5 | 5.5 | 0 |
| Comparative Example 1 | 1.0 | 0.3 | 0.43 |
| Comparative Example 2 | 3.0 | 21 | 0 |
| Comparative Example 3 | 3.5 | 32 | 0 |

As shown in Table 1 and FIG. 2, the copper concentration abruptly increases as the pH is more than 2.5. That is, it can be seen that a passive film cannot be dissolved in a range where the pH is more than 2.5, and the substitution reaction does not proceed.

On the other hand, the dissolved amount of the metallic nickel powder abruptly increases as the pH is less than 1.5. This is because nickel is dissolved regardless of the substitution reaction.

From the above results, it was confirmed that copper can be effectively removed when the pH is not less than 1.5 and not more than 2.5.

(Influence of Liquid Temperature of Aqueous Cobalt Chloride Solution)

It was confirmed that copper can be effectively removed when the pH is not less than 1.5 and not more than 2.5. Thus, the influence of the liquid temperature of the aqueous cobalt chloride solution on the copper removing effect in the case of keeping the pH within the above range was confirmed.

Example 4

A pH was adjusted to 2.0 by adding an aqueous sodium hydroxide solution having a concentration of 2 mol/L to 400 mL of an aqueous cobalt chloride solution having a pH of 0.3, a copper concentration of 45 mg/L, and a cobalt concentration of 67 g/L. Forty grams of crushed nickel briquettes as metallic nickel was added to the aqueous cobalt chloride solution to be stirred and mixed for three hours while being maintained at 70° C.

Example 5

The same operation as in Example 4 was carried out except that the temperature of the aqueous cobalt chloride solution was maintained at 60° C.

Example 6

The same operation as in Example 4 was carried out except that the temperature of the aqueous cobalt chloride solution was maintained at 50° C.

Example 7

The same operation as in Example 4 was carried out except that the aqueous cobalt chloride solution was not warmed and reacted at room temperature of 16 to 18° C.

During stirring and mixing in each of the experiments of Examples 4 to 7, the supernatant was sampled every 30 minutes, and the copper concentration in the aqueous cobalt chloride solution was confirmed using ICP emission spectrometry (measuring apparatus, manufactured by Seiko Instruments Inc., Model No. SPS 3000).

The results are shown in Tables 2 to 5 and FIG. 3.

The stirring time of 0 minutes in the tables indicates the copper concentration in a starting solution.

TABLE 2

| Stirring and mixing time (minutes) | Copper concentration (mg/L) |
|---|---|
| 0 | 45 |
| 30 | 1.3 |
| 60 | 0.7 |
| 90 | 0.6 |
| 120 | 0.6 |
| 150 | 0.5 |
| 180 | 0.5 |

TABLE 3

| Stirring and mixing time (minutes) | Copper concentration (mg/L) |
|---|---|
| 0 | 45 |
| 60 | 8.3 |
| 120 | 1.0 |
| 180 | 0.6 |

TABLE 4

| Stirring and mixing time (minutes) | Copper concentration (mg/L) |
|---|---|
| 0 | 45 |
| 60 | 30 |
| 120 | 12 |
| 180 | 2.5 |
| 240 | 1.0 |

TABLE 5

| Stirring and mixing time (minutes) | Copper concentration (mg/L) |
|---|---|
| 0 | 45 |
| 60 | 35 |
| 120 | 14.1 |
| 180 | 3.4 |
| 240 | 1.3 |

TABLE 5-continued

| Stirring and mixing time (minutes) | Copper concentration (mg/L) |
|---|---|
| 300 | 0.8 |
| 360 | 0.65 |
| 420 | 0.53 |

In all of Examples 4 to 7, it can be confirmed that the copper concentration is reduced to approximately 1 mg/L over time. In Examples 4 and 5 in which the liquid temperature of the aqueous cobalt chloride solution is high, it can be confirmed that copper separation is faster than that in Examples 6 and 7. In addition, it can be confirmed that the reaction rate abruptly increases when the liquid temperature reaches from 50° C. to 60° C.

From the above results, it can be confirmed that when the pH is set to 2.0, the copper concentration can be sufficiently reduced. In addition, it was confirmed that when the liquid temperature of the aqueous cobalt chloride solution rises to higher than 50° C., the reaction rate abruptly increases.

INDUSTRIAL APPLICABILITY

The aqueous cobalt chloride solution purification method according to the present invention is suitable for a method for removing an impurity from an aqueous cobalt chloride solution used as a raw material for a nonaqueous electrolyte secondary battery.

FIG. 1
1. Aqueous cobalt chloride solution
2. Generated aqueous solution
3. Substitution reaction
4. Metallic nickel
5. Solid matter FIG. 2
1. Copper concentration
2. Dissolved amount of metallic nickel powder
3. Adjusted pH
4. Dissolved amount of metallic Ni powder FIG. 3
1. Copper concentration
2. Stirring and mixing time (minutes)
3. Example 4

The invention claimed is:

1. An aqueous cobalt chloride solution purification method, comprising the step of:
   bringing metallic nickel into contact with an aqueous solution containing cobalt chloride, thereby removing an impurity by a substitution reaction,
   wherein a pH of the aqueous solution containing cobalt chloride is adjusted to not less than 1.5 and not more than 2.5.

2. The aqueous cobalt chloride solution purification method according to claim 1, wherein a temperature of the aqueous solution containing cobalt chloride is maintained at higher than 50° C. and not higher than 80° C.

3. The aqueous cobalt chloride solution purification method according to claim 1, wherein the impurity is copper.

4. The aqueous cobalt chloride solution purification method according to claim 1, wherein the aqueous solution containing cobalt chloride from which the impurity has been removed is used as a raw material of a positive electrode material containing in the composition of the positive electrode material nickel and cobalt in a nonaqueous electrolyte secondary battery.

5. The aqueous cobalt chloride solution purification method according to claim 4, wherein the aqueous solution containing cobalt chloride is a process liquid in a nickel smelting process.

6. The aqueous cobalt chloride solution purification method according to claim 2, wherein a temperature of the aqueous solution containing cobalt chloride is maintained at not lower than 60° C. and not higher than 80° C.

* * * * *